(12) United States Patent
Sologubenko et al.

(10) Patent No.: US 12,723,951 B2
(45) Date of Patent: Sep. 1, 2026

(54) METHOD AND CONTROLLER FOR TESTING A TWO-PHASE COOLING DEVICE, COMPUTER PROGRAM, AND COMPUTER-READABLE MEDIUM

(71) Applicant: ABB SCHWEIZ AG, Baden (CH)

(72) Inventors: Oleksandr Sologubenko, Bonstetten (CH); Daniele Torresin, Baden (CH); Andrey Petrov, Zürich (CH); Bruno Agostini, Zürich (CH)

(73) Assignee: ABB SCHWEIZ AG, Baden (CH)

( * ) Notice: Subject to any disclaimer, the term of this patent is extended or adjusted under 35 U.S.C. 154(b) by 302 days.

(21) Appl. No.: 18/292,197

(22) PCT Filed: Jun. 8, 2022

(86) PCT No.: PCT/EP2022/065444

§ 371 (c)(1),
(2) Date: Jan. 25, 2024

(87) PCT Pub. No.: WO2023/011780

PCT Pub. Date: Feb. 9, 2023

(65) Prior Publication Data

US 2024/0353293 A1 Oct. 24, 2024

(30) Foreign Application Priority Data

Aug. 5, 2021 (EP) .................................... 21189808

(51) Int. Cl.
*G01M 99/00* (2011.01)

(52) U.S. Cl.
CPC ..... *G01M 99/002* (2013.01); *F28F 2200/005* (2013.01)

(58) Field of Classification Search
CPC .... F28D 15/06; F28D 15/0283; F28D 20/021; G01M 99/002; F28F 2200/00; F28F 2200/005
See application file for complete search history.

(56) References Cited

U.S. PATENT DOCUMENTS 1,380,987 A 6/1921 Lippincott
3,777,811 A 12/1973 Shcosinger
(Continued)

FOREIGN PATENT DOCUMENTS

CN 103673706 A 3/2014
CN 105526710 A * 4/2016 ............ B21D 53/06
(Continued)

OTHER PUBLICATIONS

PCT International Search Report and Written Opinion, Application No. PCT/EP2022/065444, dated Sep. 6, 2022, 17 pps.
(Continued)

*Primary Examiner* — Octavia Hollington
(74) *Attorney, Agent, or Firm* — McCarter & English, LLP

(57) ABSTRACT

A method for testing a two-phase cooling device is provided. The cooling device has a housing surrounding a cavity and a cooling medium within the cavity. The method includes controlling a temperature of ambient air of the cooling device such that the cooling medium within the cavity transitions from its liquid state to its solid state and/or from its solid state to its liquid state, while monitoring a first temperature of the cooling device, determining whether the monitored first temperature fulfills a predetermined criterion, and determining that the cooling device is overfilled with the cooling medium if the predetermined criterion is fulfilled.

20 Claims, 9 Drawing Sheets

(56) References Cited

U.S. PATENT DOCUMENTS 4,194,559 A 3/1980 Eastman
4,248,295 A 2/1981 Ernst et al.
4,321,908 A 3/1982 Reed
4,355,522 A 10/1982 Gorski et al.
4,631,388 A 12/1986 Manning
4,664,181 A 5/1987 Sumberg
5,143,053 A 9/1992 Baer
5,579,828 A * 12/1996 Reed ...................... F28D 15/02 165/83
6,119,729 A * 9/2000 Oberholzer .............. E03B 7/10 138/28
6,684,940 B1 2/2004 Chao et al.
6,866,092 B1 * 3/2005 Molivadas ............... F01L 3/12 165/47
7,293,423 B2 11/2007 Upadhya et al.
7,532,982 B2 5/2009 Inoue
9,534,819 B2 * 1/2017 Wits .................... H05K 1/0272
9,763,359 B2 9/2017 Chan
10,317,146 B2 6/2019 Bissell et al.
10,415,837 B2 9/2019 Borovinov
11,191,190 B2 * 11/2021 Stefanoski ......... H05K 7/20881
2006/0060329 A1 3/2006 Imura et al.
2009/0044928 A1 2/2009 Upadhya et al.
2013/0092354 A1 4/2013 Semenov et al.
2016/0313068 A1 10/2016 Decker
2019/0025259 A1 1/2019 Magnusson
2019/0316851 A1 10/2019 Bissell et al.
2020/0284181 A1 9/2020 Matsumoto et al.

FOREIGN PATENT DOCUMENTS

CN 713458 B1 6/2019
CN 110192076 A 8/2019
DE 3844229 A1 7/1990
EP 0198126 A1 10/1986
EP 0596006 B1 9/1996
EP 2720261 A2 4/2014
EP 2974635 A1 1/2016
EP 3336473 A1 6/2018
FR 2624583 A1 6/1989
GB 1309757 A 3/1973
JP 57112643 A 7/1982
WO 0212814 A1 2/2002

OTHER PUBLICATIONS

Chinese Office Action for Application No. 202280048255.8, dated Mar. 18, 2026, 10 pages.

* cited by examiner

METHOD AND CONTROLLER FOR TESTING A TWO-PHASE COOLING DEVICE, COMPUTER PROGRAM, AND COMPUTER-READABLE MEDIUM

CROSS REFERENCE TO RELATED APPLICATIONS

This patent application is a National Stage Entry of PCT/EP2022/065444 filed on Jun. 8, 2022, which claims the benefit and priority of European Patent Application No. 21189808.5 filed on Aug. 5, 2021, the disclosures of which are incorporated by reference herein in their entirety as part of the present application.

BACKGROUND

The disclosure relates to the field of two-phase cooling devices. In particular, the disclosure relates to a method and a controller for testing a two-phase cooling device, to a computer program for operating the controller, and to a computer-readable medium in which the computer program is stored.

Advanced two-phase cooling devices, e.g., 3D-cooling devices, like 2D vapor chambers, and/or 2D-cooling devices, like 2D heat pipes or thermosyphons, for power electronic applications are made from a material having a high thermal conductivity, e.g., from metal, e.g., copper, and rely on using a cooling medium, e.g., water, as a working fluid for its optimal thermal properties.

FIG. 1 shows an example of a two-phase cooling device 20, in particular a heat pipe or a 2D-vapor chamber according to the prior art. The cooling device 20 has a housing 22 enclosing a cavity 24, wherein an inner wall 26 of the housing 22 surrounds the cavity 24. The cavity 24 has a top region 28 and a bottom region 30. In FIG. 1, the cooling device 20 is oriented as it would be during normal usage of the cooling device 20. With this "normal" orientation, the top region 28 is arranged above the bottom region 30. A cooling medium 32 is in the cavity 24. Further, a porous structure may be arranged within the cavity 24. The porous structure may cover at least a part of the inner wall 26 of the housing 22 and may extend from the top region 28 to the bottom region 30. The porous structure may be arranged for guiding condensed cooling medium 32 from the top region 28 to the bottom region 30.

The cooling device 20 is symmetric with respect to a symmetry axis 34. In case of the 2D-cooling device, the cooling device 20 is rotationally symmetric with respect to the symmetry axis 34. In case of the 3D-cooling device, the cooling device 20 may be mirror-symmetric, wherein the symmetry axis 34 may be representative for a corresponding symmetry plane.

In case of e.g., water as the cooling medium 32, when cooled below 0° C., the cooling medium 32 freezes. While undergoing this phase change, if there is more water inside the cavity 24 as may be contained within the porous structure, the water accumulates in the bottom region 30 because of gravity and may form a liquid water pocket, i.e., a completely enclosed amount of liquid cooling medium at some point.

FIG. 2 shows the bottom region 30, wherein the cooling medium 32 is present in the bottom region 30 as liquid cooling medium 36 and as frozen cooling medium 40. Because of the housing 22 having the high thermal conductivity, the cooling medium 32 freezes from the peripheral region of the bottom region 30 towards a center of the bottom region 30, wherein, in FIGS. 1 and 2, the center of the bottom region of 30 corresponds to the symmetry axis 34 in the bottom region 30. So, if the cooling medium 32 freezes, firstly a pool of liquid cooling medium 36 is formed within the middle of the frozen cooling medium 40. The liquid cooling medium 36, in particular the pool, has an upper surface 38. As long as there is the upper surface 38 of liquid cooling medium 36, the expansion of the frozen cooling medium 40 pushes the remaining liquid cooling medium 36 towards the top region 28 and does not subject it to high pressure. So, even if there is the pool of water, the housing 22 would not bulge.

However, if the liquid cooling medium 36 begins to be surrounded by frozen cooling medium 40, in particular if the upper surface 38 of the liquid cooling medium 32 is closed, the pool of liquid cooling medium 36 is transformed into a pocket of enclosed liquid cooling medium 36 and high pressures on the inner walls 26 of the housing 22 appear, which ultimately cause a bulging of the housing 22 and/or a leakage of the cooling medium 32 in the bottom region 30, and as a consequence a loss of cooling performance.

FIG. 3 shows the bottom region 30 of FIG. 2, wherein the cooling medium 32 is frozen such that the pocket of liquid cooling medium 36 is enclosed by the frozen cooling medium 40. The pressure acting on the housing 22 because of the expansion of the frozen cooling medium 40 and the presence of the pocket of liquid cooling medium 32 completely within the frozen cooling medium of 40 is represented by two arrows illustrating the direction 42 of the corresponding expansion force. The bulging of the housing 22 may in turn cause the leakage, through which the liquid cooling medium 36 may leak outside of the housing 22, and/or a loss of contact with the electronic component to be cooled, because of a deformed outer wall of the housing 22. Both cases will result in a failure of the cooling device 20 and/or the electronic component to be cooled.

The correct amount of liquid cooling medium 36 is a tradeoff between the cooling performance and the reliability of the cooling device 20. The cooling performance has its optimum with a specific predefined amount of water, wherein the reliability of the cooling device 20 drops, if the amount of liquid cooling medium 36 is more than may be accommodated by the porous structure. The manufactures of the cooling devices 20 tend to fill a little bit more cooling medium 32 into the cavity 24, as needed in order to be on the safe side regarding the cooling performance of the cooling device 20. However, if the cooling device 20 is overfilled, the above disadvantages may arise. Therefore, it is important to find out whether the correct amount of liquid cooling medium 36 is within the cavity 24. Thus, there is a need for a method for testing a two-phase cooling device 20, in particular for testing whether the cooling device 20 is overfilled or not.

BRIEF DESCRIPTION

Therefore, it is an aspect of the present disclosure to provide a method for testing a two-phase cooling device, in particular for testing whether the cooling device is overfilled or not, which may be carried out easily, which may be carried out without the need to open the cooling device and/or to measure the amount of cooling medium within the cooling device, e.g. by removing the cooling medium and measuring its volume, and/or which is very accurate.

These aspects are achieved by the subject-matter of the independent claims. Further exemplary embodiments are evident from the dependent claims and the following description.

In particular, an aspect of the present disclosure is achieved by a method for testing a two-phase cooling device. The cooling device has a housing surrounding a cavity and a cooling medium within the cavity. The method includes controlling a temperature of ambient air of the cooling device such that the cooling medium within the cavity transitions from its liquid state to its solid state and/or from its solid state to its liquid state, while monitoring a first temperature of the cooling device, determining whether the monitored first temperature fulfills a predetermined criterion, and determining that the cooling device is overfilled with the cooling medium if the criterion is fulfilled.

As explained above with respect to FIG. 3, if the cooling device is overfilled, the pool of liquid cooling medium is formed in the bottom region. If the cooling device is cooled down to a freezing temperature of the cooling medium or below, the enclosed pocket of liquid cooling medium is formed within the frozen cooling medium. The pool as well as the pocket of liquid cooling medium result in that the cooling device has a much larger latent heat within the bottom region than in the top region. This effect can accurately be seen from the monitored first temperature at the phase transitions. In addition, measuring and monitoring the first temperature may be carried out in an easy way. Further, the method may be carried out without the need to open the cooling device and/or to measure the amount of cooling medium within the cooling device, e.g., by removing the cooling medium and measuring its volume.

Therefore, the above method for testing the two-phase cooling device, in particular for testing whether the cooling device is overfilled or not, may be carried out easily, may be carried out without the need to open the cooling device and/or to measure the amount of cooling medium within the cooling device, e.g., by removing the cooling medium and measuring its volume, and/or is very accurate.

The two-phase cooling device may be a 3D-cooling device, like a 3D vapor chamber, and/or a 2D-cooling device, like a 2D heat pipe or thermosyphon. The housing may include or may be made of a metal having a high thermal conductivity, e.g., copper. During normal usage of the two-phase cooling device, the top region is arranged above the bottom region. The cooling medium may for example be water. The predetermined criterion may be a predetermined temperature pattern over time. The first temperature of the cooling device may be monitored by receiving a signal from a first sensor, which may be arranged at the outside of the housing in thermal contact with the housing, which may be thermally isolated against the ambient air, and which may be arranged at the bottom region.

If the predetermined criterion is the predetermined temperature pattern, a neuronal network may be trained and used to differentiate temperature patterns of cooling devices, which are overfilled, from temperature patterns of cooling devices, which are not overfilled. The training may be carried out with the help of a training set of temperature patterns of correspondingly overfilled and properly filled cooling devices.

According to an embodiment, it is determined whether the monitored first temperature fulfills the at least one predetermined criterion by determining at least one graph, which represents the monitored first temperature over the time, during which the first temperature is monitored, and determining whether the graph fulfills the predetermined criterion. For example, if the first temperature is measured for a give duration, e.g., during at least one of the phase transitions, the first temperature may not be measured continuously but at regular time intervals, e.g., at time intervals of a view seconds, e.g., every 6 or 8 seconds. Then, a trendline or average line may be determined from the measured temperature values, wherein the graph may correspond to the determined trendline or, respectively, average line. The graph enables in an easy way to see the temperature behavior of the cooling device on the first side. Further, the graph enables an easy mathematical analysis of the temperature behavior of the cooling device. The graph may be composed of a plurality of temperature measurements at consecutive time points.

According to an embodiment, the graph of the monitored first temperature includes a first section with falling temperature indicating an supercooling of the cooling medium in its liquid state inside the cooling device, after that the graph includes a jump to a freezing temperature of the cooling medium indicating the start of freezing of the cooling medium, after that the graph includes a second section at the freezing temperature of the cooling medium indicating the freezing of the cooling medium, and after that the graph includes a third section with falling temperature, wherein the predetermined criterion is searched in the third section. Searching the predetermined criterion in the third section only enables to ignore measured temperature values outside of the third section or enables to only measure the first temperature within the third section. In both cases the amount of measured temperature values is decreased. Therefore, a smaller amount of data has to be handled and analyzed. So, searching for the predetermined criterion in the third section only contributes to the simple and easy testing of the cooling device.

According to an embodiment, it is determined whether the graph fulfills the predetermined criterion by determining a first derivative of the graph, and determining an amount of extreme values of the derivate of the graph during one of the phase transitions and/or within the third section, wherein the predetermined criterion is fulfilled, if the derivate of the signal has at least two extreme values. The positions of the extreme values of the derivative correspond to the positions of turning points of the original graph. The extreme values each may be a local maximum or a local minimum of the derivative, and/or may be referred to as "peak". In an optimally filled cooling device the cooling medium is absorbed within the porous structure having a relatively even thickness and porosity. Therefore, the cooling medium is evenly distributed over the cavity and the phase transition also takes places quite evenly and the derivate of the graph normally has only one extreme value. In contrast, if the cooling device is overfilled, firstly the above-described pool and then the above-described pocket of liquid cooling medium are formed. In this case, the cooling medium is not evenly distributed over the cavity and correspondingly the phase transition of the cooling medium also does not take place evenly. This effect is reflected in the graph and may be seen quite easily from the derivative of the graph having the at least two extreme values. So, determining the first derivative of the graph and counting the amount of extreme values may contribute to accurately and easily find out, whether the cooling device is overfilled or not.

According to an embodiment, it is determined whether the graph fulfills the predetermined criterion by determining a width of the graph during at least one of the phase transitions of the cooling medium and/or within the third section, wherein the predetermined criterion is fulfilled, if the determined width is larger than a predetermined width threshold. As explained above, in an optimally filled cooling device the cooling medium is evenly distributed over the cavity. Therefore, a latent heat density along the cooling device is relatively constant. During cooling of the cooling device by ambient air convection, the heat flux is relatively evenly distributed across the surface of the housing of the cooling device also. In contrast, because of the formation of the pool and the pocket within an overfilled cooling device the cooling device has a much larger latent heat within the bottom region, where the pool and the pocket are formed. Therefore, during cooling or heating across the freezing temperature of the cooling medium, even when the phase transition is already complete for the cooling medium in the porous structure, the phase transition continues in the bottom region of the cooling device. The more excess cooling device is collected in the bottom region, the longer take the phase transitions. So, overfilled cooling devices have a tendency to go along with a long phase transitions, during freezing as well as during melting. The duration of the phase transition is reflected in the width of the graph showing the phase transition. So, determining the width of the graph during at least one of the phase transitions of the cooling medium and/or within the third section, and determining that the predetermined criterion is fulfilled, if the determined width is larger than a predetermined width threshold, contributes to accurately and easily determining whether the cooling device is overfilled or not.

According to an embodiment, the first temperature is sensed at the bottom region of the housing, the method further including monitoring a second temperature of the cooling device, wherein the second temperature is sensed at an upper part of the housing, while monitoring the first temperature, and determining a difference between the monitored first and second temperature during at least one of the phase transitions of the cooling medium and/or within the third section, wherein the predetermined criterion is fulfilled, if the determined difference is larger than a predetermined difference threshold. As explained above, in an optimally filled cooling device the latent heat density along the cooling device is relatively constant and the heat flux is relatively evenly distributed across the surface of the housing of the cooling device also. Therefore, the temperature along the cooling device is relatively constant and a difference between the first temperature and the second temperature would be quite small. In contrast, because of the formation of the pool and the pocket within an overfilled cooling device, the cooling device has a much larger latent heat within the bottom region than in the top region. Therefore, with an overfilled cooling device, the difference between the first temperature and the second temperature is quite big. So, it may be determined that the cooling device is overfilled, if the difference is larger than the predetermined difference threshold.

According to an embodiment, the first temperature is monitored for a predetermined amount of time. For example, the first temperature may be monitored from the beginning of the test, when the cooling of the cooling device starts, to the end of the test, when the cooling device has its initial temperature again. Alternatively, the first temperature may be monitored only from the beginning of the freezing until the ending of the melting of the cooling medium. Alternatively, the first temperature may be monitored only from the beginning of the freezing until the ending of the freezing of the cooling medium. Alternatively, the first temperature may be monitored only from the beginning of the melting until the ending of the melting of the cooling medium. If it is determined whether the cooling device is overfilled or not by counting the amount of extreme values of the first derivative or by analyzing the width of the graph, it is advantageous, if the first temperature is only monitored for one of the phase transitions or if the first temperature is monitored all over the test but only those values are analyzed which are monitored during one of the phase transitions. If it is determined whether the cooling device is overfilled or not by counting the amount of extreme values of the first derivative, the criterion of having at least two extreme values refers to one of the phase transitions only. In other words, when analyzing the first derivative of the graph during both phase transitions the corresponding derivative must have at least four extreme values in order to being able to classify the cooling device is being overfilled.

According to an embodiment, the method further includes arranging the cooling device in a temperature chamber, which encloses the ambient air and which enables the control of the temperature of the ambient air, prior to controlling the temperature of the ambient air.

According to an embodiment, the method further includes arranging the first sensor at the housing such that the first sensor has the thermal contact to the housing and is thermally isolated against the ambient air, prior to controlling the temperature of the ambient air.

According to an embodiment, the first sensor is arranged at a bottom region of the housing. The effects of the overfilling of the cooling device may be seen at best within the bottom region, because of the formation of the pocket and the pool. Therefore, the effects on the first temperature are the strongest within the bottom region. Therefore, arranging the first sensor at the bottom region and correspondingly sensing the first temperature in the bottom region may contribute to a very easy and accurate determination of whether the cooling device is overfilled or not.

The above features, advantages and/or effects of the method for testing the two-phase cooling device may be transferred to the controller for testing the two-phase cooling device, the computer program for operating the controller, and/or to the computer-readable medium on which the computer program is stored, as explained in the following. Therefore, a repetition of these features, advantages and/or effects is omitted and it is referred to the above explanations only in order to provide a concise description.

An aspect of the present disclosure is achieved by the controller for testing the two-phase cooling device. The controller includes a processor and a memory. The processor is configured to carry out the above method.

An aspect of the present disclosure is achieved by the computer program for operating the controller, which, when being executed by a processor, is adapted for performing the above method.

An aspect of the present disclosure is achieved by the computer-readable medium on which the above computer program is stored.

These and other aspects of the disclosure will be apparent from and elucidated with reference to the embodiments described hereinafter.

BRIEF DESCRIPTION OF THE DRAWINGS

The subject matter of the disclosure will be explained in more detail in the following text with reference to exemplary embodiments which are illustrated in the attached drawings.

The reference symbols used in the drawings, and their meanings, are listed in summary form in the list of reference symbols. In principle, identical parts are provided with the same reference symbols in the figures.

DETAILED DESCRIPTION

Figure 1:
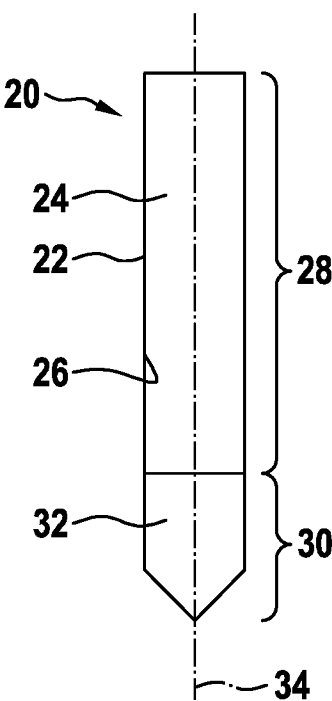
FIG. 1 schematically shows a two-phase cooling device according to the prior art.

FIG. 1 schematically shows a two-phase cooling device 20 according to the prior art. The cooling device 20 may be a 3D-cooling device, e.g., a 3D vapor chamber, or a 2D-cooling device, e.g., a 2D heat pipe or a thermosyphon. The cooling device 20 may be used for cooling an electronic component (not shown). The electronic component may be an electronic circuit, an integrated circuit, a chip, a transformer, etc.

The cooling device 20 includes a housing 22. The housing 22 may include or may be made of a material having a high thermal conductivity, e.g., a metal, e.g., copper. The housing 22 encloses a cavity 24. The cavity 24 is surrounded by an inner wall 26 of the housing 24. In FIG. 1, the cooling device 20 is orientated as it would be during normal usage, i.e., when cooling the electronic component. With this "normal" orientation, a top region 28 of the cooling device 20 is above a bottom region 30 of the cooling device 20. A cooling medium 32, e.g., water, is arranged within the cavity 24. Further, the cooling device 20 may include a porous structure (not shown), which may be arranged at the inner wall 26 and/or which may be arranged all over the cavity 24. The cooling device 20 is symmetric with respect to a symmetry axis 34. In case of the 2D-cooling device, the cooling device 20 may be rotationally symmetric with respect to the symmetry axis 34. In case of the 3D-cooling device, the cooling device 20 may be mirror-symmetric, wherein the symmetry axis 34 may be representative for a corresponding symmetry plane.

Prior to the use of the cooling device 20, the cooling medium 32 is in a liquid state. During normal usage of the cooling device 20, the cooling device 20 has thermal contact to the electronic component to be cooled at least in the bottom region 30 and absorbs at least in part the thermal energy generated by the operation of the electronic component. If the cooling device 20 absorbs sufficient thermal energy from the electronic component, the cooling medium 32 transitions at least in part from the liquid state to a gaseous state. The cooling medium 32 in the gaseous state rises to the top region 28 and condenses in the top region 28. The condensed cooling medium 32 is guided by the porous structure from the top region 28 to the bottom region 30. If all of the cooling medium 32 is in the liquid state, at least a part of the cooling medium 32 is absorbed within the porous structure. If there is more liquid cooling medium 32 in the cavity 24 than may be absorbed by the porous structure, the rest of the cooling medium 32 accumulates within the bottom region 30.

Figure 2:
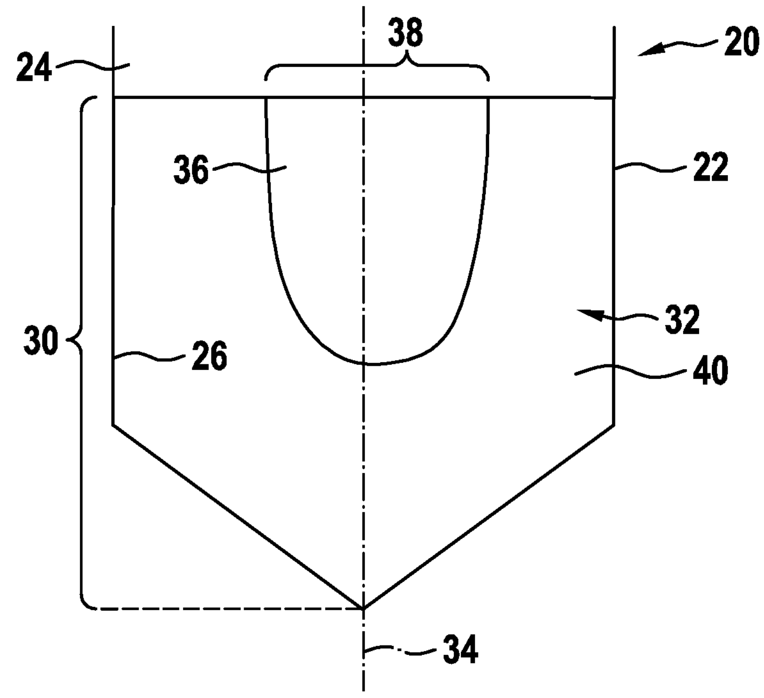
FIG. 2 schematically shows a detailed view of a two-phase cooling device according to the prior art in a first state.

FIG. 2 schematically shows a detailed view of a two-phase cooling device 20 according to the prior art in a first state, e.g., the cooling device 20 according to FIG. 1. In the first state, a part of the cooling medium 32 is frozen and the rest of the cooling medium 32 is still liquid. In particular, a pool of liquid cooling medium 36 having an upper surface 38 is partly embedded within frozen cooling medium 40. If the freezing process proceeds, the liquid cooling medium 36 may be pressed upwards by an expansion of the frozen cooling medium 40 as long as the upper surface 38 of the pool is open and as such exists. However, because of the higher thermal conductivity of the material of the housing 22, the upper surface 38 of the pool may be closed by the frozen cooling medium 40 and as such may disappear.

Figure 3:
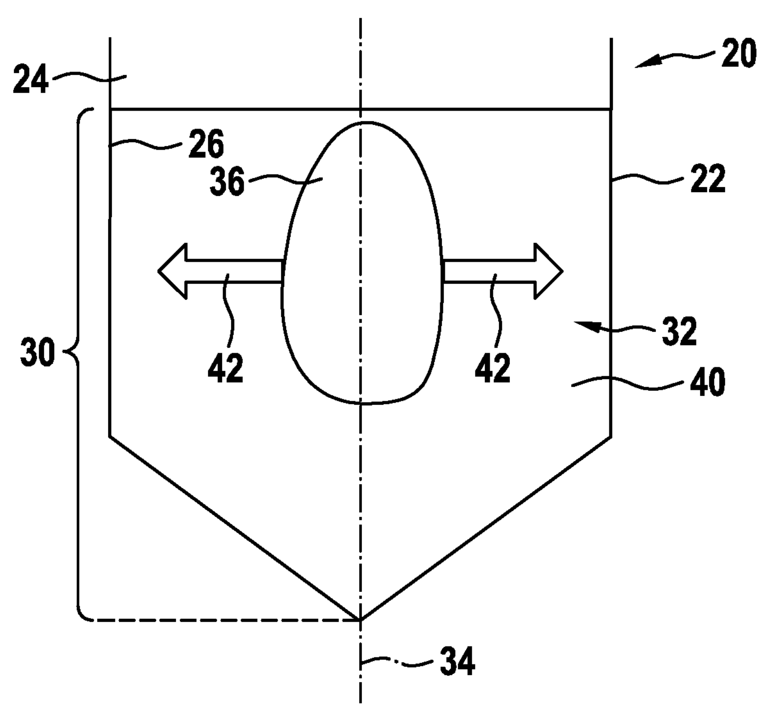
FIG. 3 schematically shows the two-phase cooling device according to FIG. 2 in a second state.

FIG. 3 schematically shows the two-phase cooling device 20 according to FIG. 2 in a second state. In the second state, a pocket of a liquid cooling medium 36 is formed. The pocket of liquid cooling medium 36 is completely enclosed by the frozen cooling medium 40. If the freezing process proceeds further, the frozen cooling medium 40 increases and expands further, but the liquid cooling medium 36 cannot be pressed upwards, because the pocket is closed. Then, an expansion force is created, which acts on the inner wall 26 of the housing 22 in a direction 42 pointing outward. This expansion force may lead to a bulging of the housing 22 and may, if the bulging proceeds, lead to a leakage in the housing 22.

The formation of the pocket of liquid cooling medium 36 and the associated bulging of the housing 22 and in case the leakage of the housing 22 may be avoided, if only those cooling devices 20 are used for applications at or below the freezing temperature of the cooling medium 32, which are not overfilled and/or in which the whole liquid cooling medium 36 may be absorbed by the porous structure. In this context it should be noted that a very small amount of excess cooling medium, i.e., more liquid cooling medium 36 than may be absorbed by the porous structure, may be tolerable. The corresponding cooling device 20 may be classified as not being overfilled, because such a very small amount of excess cooling medium does not harm the cooling device 20, if the cooling medium 32 freezes, because of the elasticity of the material of the housing 22 of the cooling device 20. For example, a cooling device 20 having an amount of 1% to 7%, e.g., 2% to 6%, e.g., 5% of excess of the cooling medium 32 still may be regarded as not being overfilled. In contrast, this additional amount may be provided in order to guarantee the expected cooling performance without damaging the housing 22 of the cooling device 20.

The inventors of the present disclosure have recognized that a temperature behavior of the cooling device 20 during a phase transition of the cooling medium 32 from its liquid state to its frozen state or vice versa may be representative for whether the cooling device 20 is overfilled or not.

Figure 4:
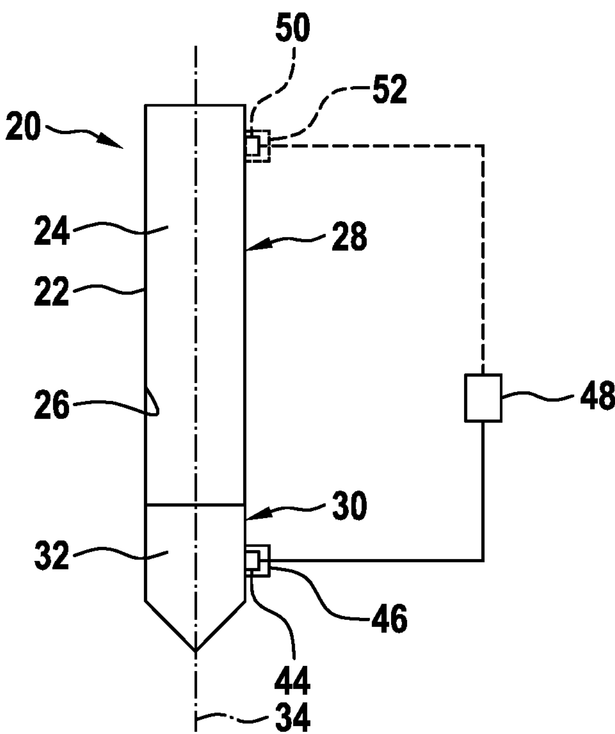
FIG. 4 schematically shows an exemplary embodiment of a two-phase cooling device in a test situation, according to the present disclosure.

FIG. 4 schematically shows an exemplary embodiment of a two-phase cooling device 20 in a test situation, according to the present disclosure. The cooling device 20 may correspond to the above cooling device 20. The cooling device 20 in the test situation may be arranged in the temperature chamber. The temperature chamber includes ambient air, wherein the temperature of the ambient air may be controlled. In particular, the temperature may be controlled such that the ambient air and the cooling device 20 may be cooled below the freezing temperature of the cooling medium 32.

A first sensor 44 for measuring a first temperature of the cooling device 20 may be arranged at an outer circumference of the housing 22. In particular, the first sensor 44 may be arranged at the housing 22 in the bottom region 30. The first sensor 44 may be in thermal and/or direct contact with the housing 22. For example, the first sensor 44 may be fixed to the housing 22 by a thin layer of a thermally conductive glue. The first sensor 44 may be thermally isolated against the ambient air by a first insulation 46.

A second sensor 50 for measuring a second temperature of the cooling device 20 may be arranged at an outer circumference of the housing 22. In particular, the second sensor 44 may be arranged at the housing 22 above the first sensor 44, e.g., in the top region 28. The second sensor 50 may be in thermal and/or direct contact with the housing 22. For example, the second sensor 50 may be fixed to the housing 22 by a thin layer of a thermally conductive glue. The second sensor 50 may be thermally isolated against the ambient air by a second insulation 52.

The first and in case the second sensor 44, 50 may be electrically coupled to a controller 48. The controller 48 may be arranged for receiving a first signal from the first sensor 44 and in case a second signal of the second sensor 50. The first signal may be representative for the first temperature. The second signal may be representative for a second temperature. The controller 48 may be configured to monitor the first and/or second temperature over the predetermined amount of time, e.g., during the whole test, during a transition of the cooling medium from its liquid state to its solid state and afterwards from its solid state to its liquid state, or during one of these phase transitions only. Further, the controller 48 may be configured to analyze the monitored first and/or second temperature regarding whether the cooling device 20 is overfilled or not. In other words, the controller 48 may be configured to carry out a method for testing the cooling device 20, in particular regarding whether the cooling device 20 is overfilled or not. Furthermore, the controller 48 may be configured to control the temperature of the ambient air in the temperature chamber. The controller 48 may include a processor and a memory. The controller 48 may be regarded as and/or may be coupled to a computer. If the controller 48 is coupled to a computer, one or more of the above tasks of the controller 48 may be outsourced to the computer.

Figure 5:
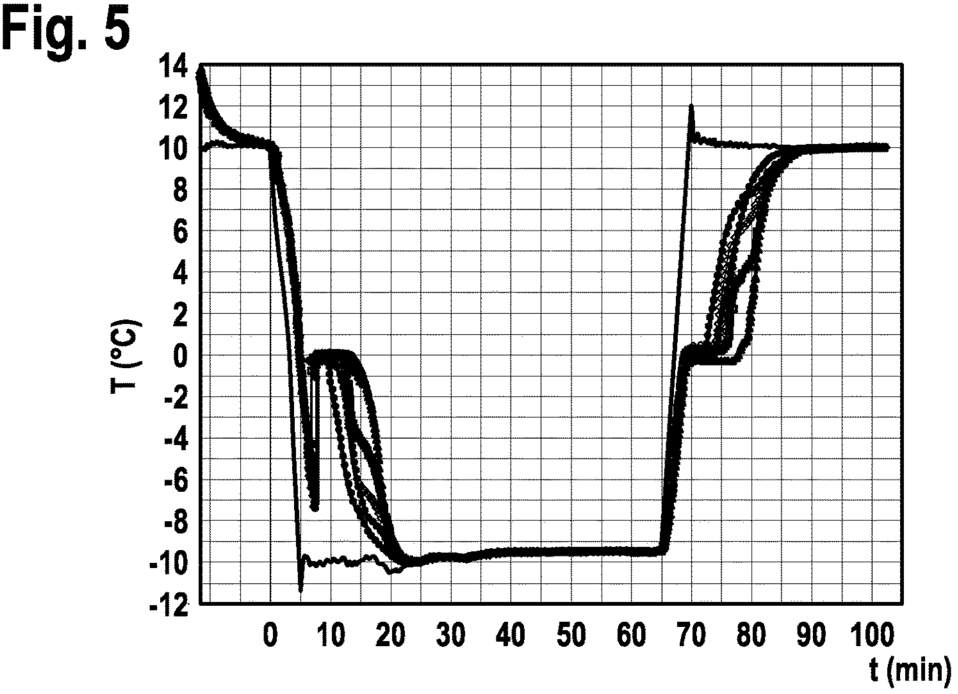
FIG. 5 shows a first diagram including several graphs, which represent temperatures of the same cooling devices having different amounts of cooling medium during freezing and melting of the cooling medium.

FIG. 5 shows a first diagram including several graphs, which represent temperatures of the cooling devices 20 of the same type, which have different amounts of cooling medium 32, during freezing and melting of the corresponding cooling medium 32. The cooling devices 20 may correspond to the above cooling device 20. For example, the cooling devices 20 are arranged in the above temperature chamber, in which the temperature of the ambient air may be controlled.

The cooling devices 20 may be cooled from 10° C. to −10° C. starting at t=0 min. The temperatures of the ambient air and of the cooling devices 20 are represented by corresponding graphs within the first diagram. According to FIG. 5, the temperature of the ambient air drops from 10° C. to −10° C. within the first five minutes. All other graphs, representing the temperatures of the cooling devices 20, roughly show a similar behavior. In particular, all temperatures except for the temperature of the ambient air drop down to −4° C. to −8° C. in first sections of the corresponding graphs. This behavior may be called supercooling effect and takes place before the cooling medium 32 starts freezing. The amount of supercooling does not correlate with the amount of the cooling medium 32 within the cooling devices 20 and may slightly vary for different test cycles.

At some moment during cooling, in FIG. 5 at about t=7 min, the freezing of the cooling medium 32 starts and the temperatures sensed by the sensors 44, 50 simultaneously jump up to 0° C. This jump is followed by a second section of the graphs, which represents a period of evenly freezing of the cooling medium 32 and during which the temperatures remain close to 0° C.

After this second section, in FIG. 5 between t=10 min and t=15 min, the temperatures start going down again in a third section. At the beginning of the third section, freezing is complete in the vicinity of the first sensor 44 but not yet complete in the bottom region 30, where there is the pool of liquid cooling medium 36. The housing 22, which normally has a high thermal conductivity and/or which for example may be made from copper, provides a thermal link between the first sensor 44 and the freezing liquid cooling medium 36 at the bottom. That is why the temperature measured by the first sensor 44 never reaches the ambient temperature as long as some cooling medium 32 is in its liquid state at the bottom. After the third section, the freezing is completed everywhere within the cavity 24, and there is no more liquid cooling medium 36 in the cavity 24, signaling the completion of freezing. The curves of temperatures within this third section strongly vary depending on the amount of cooling medium 32 within the cooling devices 20, if the cooling devices 20 are overfilled. Therefore, this third section may be used for determining whether the cooling devices 20 are overfilled or not, as explained below.

After the third section, the temperature is held at below −10° C. for a predetermined duration, in FIG. 5 until about t=65 min. Then, the temperature of the ambient air is raised to 10° C. All temperatures show an inverse but similar behavior during this heating process as they showed during cooling, except for the supercooling effect. In particular, the temperature of the ambient air jumps to 10° C. within 5 min (t=70 min). The temperatures of the cooling devices 20 rise quite evenly until 0° C., corresponding to the first section of the cooling process.

Then, the melting of the cooling medium 32 starts and the temperatures stay around 0° C. for about 5 to 10 minutes, corresponding to the second section of the cooling process.

Afterwards, in FIG. 5 between about t=73 min and t=90 min, the temperatures start going up again, corresponding to the third section, signaling the completion of melting, but not simultaneously. The curse of temperatures within this section strongly varies depending on the amount of cooling medium 32 within the cooling devices 20, if the cooling devices 20 are overfilled. Therefore, this section of the melting process, corresponding to the third section of the cooling process may be used for determining whether the cooling devices 20 are overfilled or not, as explained below. After this section, the test may be stopped, and the results may be evaluated.

Figure 6:
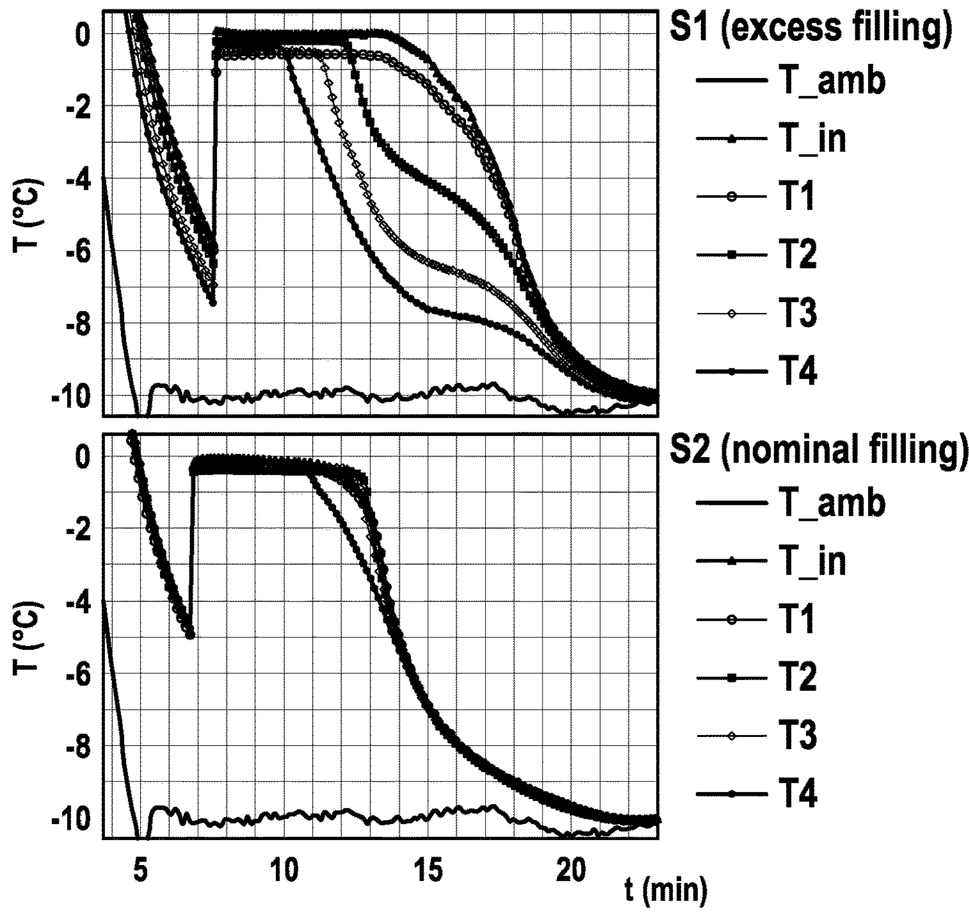
FIG. 6 shows a second and a third diagram each including several graphs, which represent temperatures of the same cooling devices having different amounts of cooling medium during freezing of the cooling medium.
Figure 7:
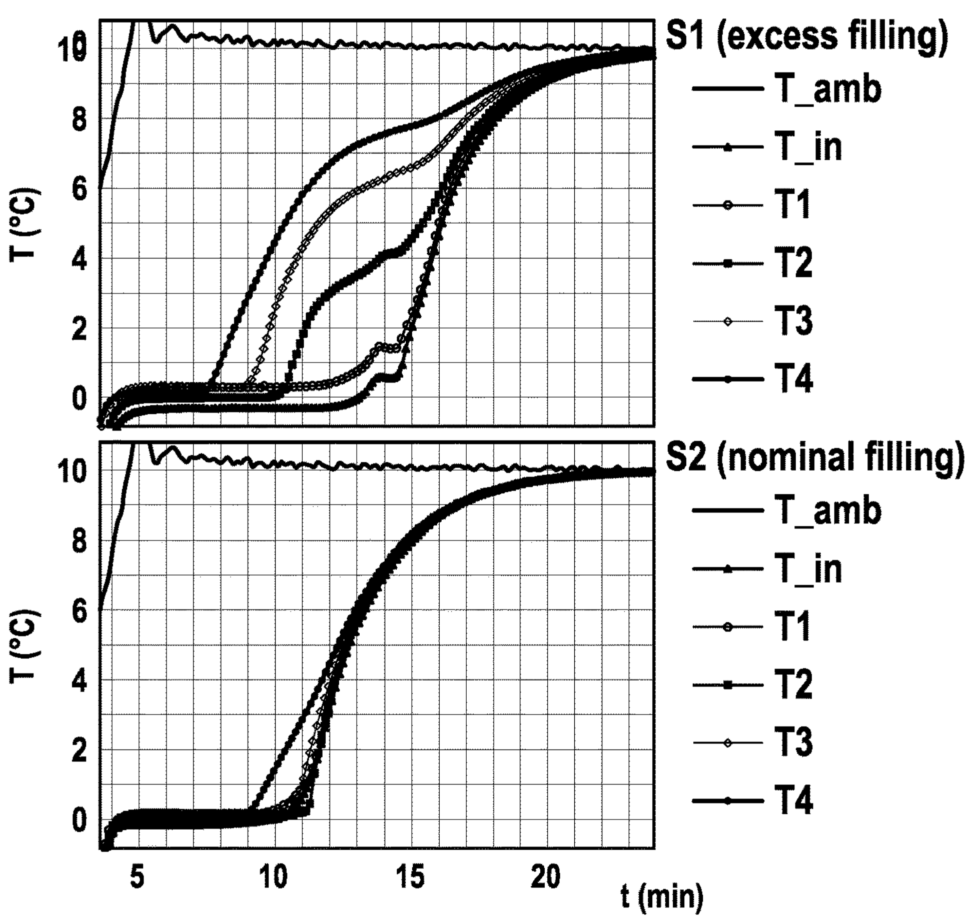
FIG. 7 shows a fourth and a fifth diagram each including several graphs, which represent temperatures of the same cooling device having different amounts of cooling medium during melting of the cooling medium.

FIG. 6 shows a second and a third diagram each including several graphs, which represent temperatures of the same cooling devices 20 having different amounts of cooling medium 32 during freezing of the cooling medium. In particular, the second diagram shown in FIG. 6 above the third diagram is a detailed view of the temperature graphs of an overfilled cooling device 20, i.e., a first cooling device S1, shown in FIG. 5. The third diagram is a detailed view of the temperature graphs of a properly filled cooling device 20, i.e., a second cooling device S2, shown in FIG. 5. These detailed views refer to the cooling process only. The detailed views of the melting process are shown in FIG. 7.

The second as well as the third diagram show graphs of an ambient temperature T_amb within the temperature chamber, an internal temperature T_in within the corresponding cooling device 20, and first, second, third, and fourth temperatures T1, T2, T3, T4 measured with sensors at the housing 22 of the corresponding cooling device 20. In particular, the first temperature T1 and the second temperature T2 may be sensed by the corresponding first sensors 44 and, respectively, the corresponding second sensors 50. The third and the fourth temperature T3, T4 may be sensed with corresponding further sensors (not shown) attached at the housings 22 in the top regions 28 with increasing distance to the corresponding bottom regions 30.

Firstly, the cooling devices 20 may be cooled from 10° C. to −10° C. starting at t=0 min, as explained above. In both diagrams, the ambient temperature T_amb drops to −10° C. within the first five minutes. All other temperatures T_in, T1, T2, T3, T4 drop down to −4° C. to −8° C. in first sections of both diagrams due to the above supercooling effect.

At about t=7 min, the freezing of the cooling medium 32 starts and the temperatures T_in, T1, T2, T3, T4 simultaneously jump up to 0° C. This jump is followed by the second sections of the graphs, which represents the period of evenly freezing of the cooling medium 32 and during which the temperatures remain close to 0° C. In the second diagram, representing the temperatures of the overfilled cooling device 20, the duration of the second section varies depending on position of the corresponding sensor 44, 50 at the housing 22. This is because the cooling medium 32 finishes freezing first within the top region 28 of the cooling devices 20, in which the cooling medium is evenly distributed within the porous structure. In contrast, within the bottom region 28, where the additional cooling medium 32 is accumulated, e.g., with the pool, the freezing finishes last. As may be seen from a comparison of the second and third diagrams, this difference is significant only for the overfilled cooling device 20 represented by the second diagram. In contrast, for optimally charged cooling device 20 represented by the third diagram, the freezing completes almost simultaneously along the whole height of the cooling device 20, except for the very top at which the fourth temperature T4 is measured.

Similarly, within the third sections, in which the temperatures T_in, T1, T2, T3, T4 drop down again, there is a significant difference between the properly filled cooling device 20 represented by the third diagram and the overfilled cooling device 20 represented by the second diagram. In particular, in the third diagram, the temperatures T_in, T1, T2, T3, T4 drop down quite evenly. In contrast, in the second diagram, the first to fourth temperatures T1, T2, T3, T4 measured at the housing 22 of the corresponding cooling device 20 drop down unevenly, wherein the corresponding graphs show at least two turning points.

A likely explanation of the observed differences between the differently filled cooling devices 20 is the following: in an optimally filled cooling device 20 the liquid cooling medium 32 is basically absorbed within the porous structure having a relatively even thickness and porosity. Therefore, a latent heat density along the cooling device 20 is relatively constant. During the cooling of the cooling device 20 by the ambient air convection, the heat flux is relatively evenly distributed across an outer surface of the cooling device 20. Therefore, the freezing of the liquid cooling medium 36 or the melting of the frozen cooling medium 40 (explained with respect to FIG. 8) within the porous structure begins and ends approximately simultaneously. In contrast, liquid cooling medium 36 within the vertically oriented overfilled cooling device 20 forms the pool or the pocket of liquid cooling medium 36 within the bottom region 30. Therefore, the cooling device 20 has a much larger latent heat within the bottom region 30 compared to the top region 28 of the same cooling device 20. During the cooling or heating across 0° C., even if the phase transition is already completed for cooling medium 32 within the porous structure, the freezing/melting continues within the bottom region 30 of the cooling device 20. Therefore, and due to high thermal conductivity of the walls and the porous structure of the cooling device 20, the temperature of the wall cannot change freely until the pool and/or the pocket within the bottom region 30 is completely frozen or, respectively, melted. This leads to the broadening of the third sections, in particular of the graphs within the third sections, to the two or more turning points of the graphs within the third sections, and to the differences of the graphs of the temperatures T1, T2, T3, T4 measured by the corresponding sensors 44, 50 at the outside of the housing 22 of the cooling devices 20 within the third sections. The more excess liquid cooling medium 36 is collected within the bottom region 30, the broader are the third sections showing the freezing transitions, and the broader are the melting transitions also.

So, it may be determined whether one of the cooling devices 20 is overfilled or not by analyzing the width of the first to fourth temperature graphs T1, T2, T3, T4, the differences of the graphs of the temperatures T1, T2, T3, T4, and/or the amount of turning points of the graphs, each within the third section. For example, a width threshold may be determined in advance such that it may be determined that the cooling device 20 is overfilled, if the width of at least one of its temperature graphs within the third section is larger than the predetermined width threshold. Alternatively or additionally, a difference threshold may be determined in advance such that it may be determined that the cooling device 20 is overfilled, if a difference between the temperatures measured in the top region 28, e.g. the fourth temperature T4, and the temperatures measured in the bottom region 30, e.g. the first temperature T1, within the third section is larger than the predetermined difference threshold. Alternatively or additionally, the amount of turning points of at least one of the temperature graphs corresponding to the temperature in the bottom region 30, e.g. the first temperature T1, may be determined and it may be determined that the cooling device 20 is overfilled, if there are two or more turning points of the corresponding temperature graph within the third section. The turning points may be determined directly or may be derived from the first derivative of the corresponding temperature graph, wherein the positions of local extreme values of the derivative correspond to the positions of the turning points of the original graph.

FIG. 7 shows a fourth and a fifth diagram each including several graphs, which represent temperatures of the same cooling device 20 having different amounts of cooling medium 32 during melting of the cooling medium 32. In particular, the fourth diagram shown in FIG. 7 above the fifth diagram is a detailed view of the temperature graphs of the overfilled cooling device 20 shown in FIG. 5. The fifth diagram is a detailed view of the temperature graphs of the properly filled cooling device 20 shown in FIG. 5. These detailed views refer to the melting process only. The detailed views of the freezing process are shown above in FIG. 6. The different sections of the graphs during the melting process widely correspond to the inverse freezing process. In particular, the graphs of the first to fourth temperatures T1, T2, T3, T4 show the same uneven behavior in the section corresponding to the third section, i.e., between about t=7 min and about t=24 min, as they show during freezing. Therefore, it may be determined whether the cooling device 20 is overfilled or not by analyzing the temperatures, in particular the graphs representing the temperatures, during the melting process, in accordance with the above determination during the freezing process.

So, it may be determined whether one of the cooling devices 20 is overfilled or not by analyzing the width of the first to fourth temperature graphs T1, T2, T3, T4, the differences of the graphs of the temperatures T1, T2, T3, T4, and/or the amount of turning points of the graphs, each within the "melting" section corresponding to the third section during freezing. For example, a width threshold may be determined in advance such that it may be determined that the cooling device 20 is overfilled, if the width of at least one of its temperature graphs within the corresponding melting section is larger than the predetermined width threshold. Alternatively or additionally, a difference threshold may be determined in advance such that it may be determined that the cooling device 20 is overfilled, if a difference between the temperatures measured in the top region 28, e.g. the fourth temperature T4, and the temperatures measured in the bottom region 30 within the corresponding melting section is larger than the predetermined difference threshold. Alternatively or additionally, the amount of turning points of at least one of the temperature graphs corresponding to the temperature in the bottom region 30, e.g. the first temperature T1, may be determined and it may be determined that the cooling device 20 is overfilled, if there are two or more turning points of the corresponding temperature graph within the corresponding melting section. The turning points may be determined directly or may be derived from the first derivative of the corresponding temperature graph, wherein the positions of local extreme values of the derivative correspond to the positions of the turning points of the original graph.

Figure 8:
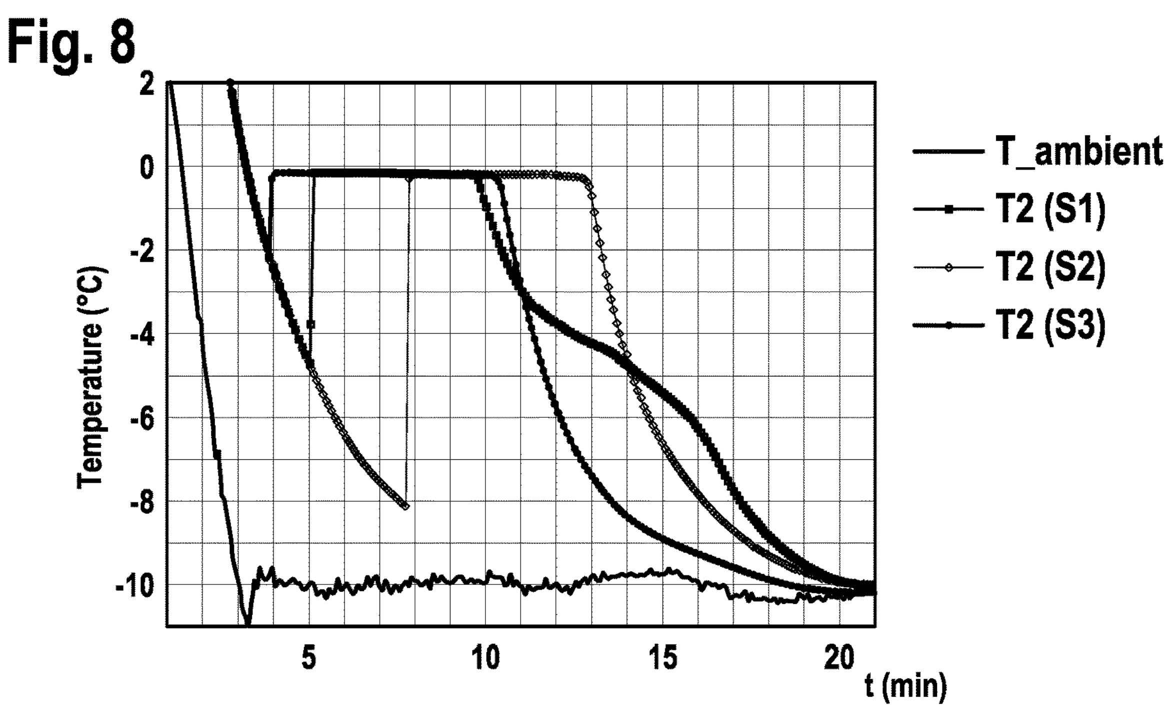
FIG. 8 shows a sixth diagram including several graphs, which represent temperatures of different cooling devices having different amounts of cooling medium during freezing.

FIG. 8 shows a sixth diagram including several graphs, which represent temperatures of different cooling devices 20 having different amounts of cooling medium 32 during freezing. In particular, the first cooling device S1 is overfilled, the second cooling device S2 has the proper amount of cooling medium 32, and a third cooling device S3 has an amount of cooling medium 32 as provided from the manufacturer of the cooling devices 20. The cooling devices S1, S2, S3 correspond to the cooling device 20 and only differ from each other by the contained amount of cooling medium 32. As may be seen from FIG. 8, only the temperature graph of the overfilled first cooling device S1 shows the broad phase transition and the two turning points within the third section.

Figure 9:
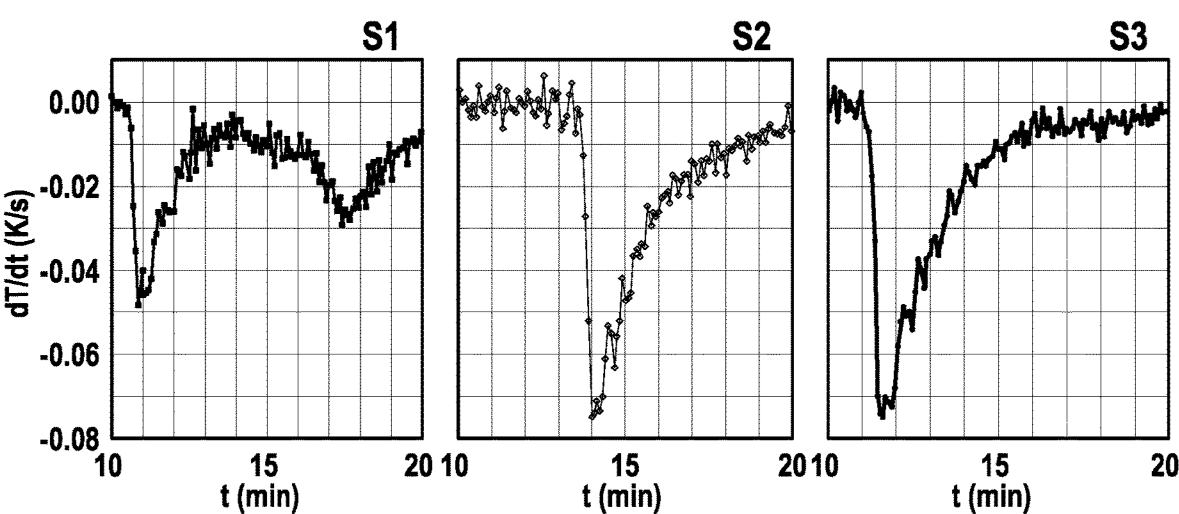
FIG. 9 shows a seventh diagram including first derivatives of the graphs representative for the temperatures of the different cooling devices according to FIG. 8.

FIG. 9 shows a seventh diagram including first derivatives of the graphs representative for the temperatures of the different cooling devices 20 according to FIG. 8. As may be seen from FIG. 9, only the derivative of the graph of the overfilled first cooling device S1 shows the two extreme values, in this case local minima, within the third section.

Figure 10:
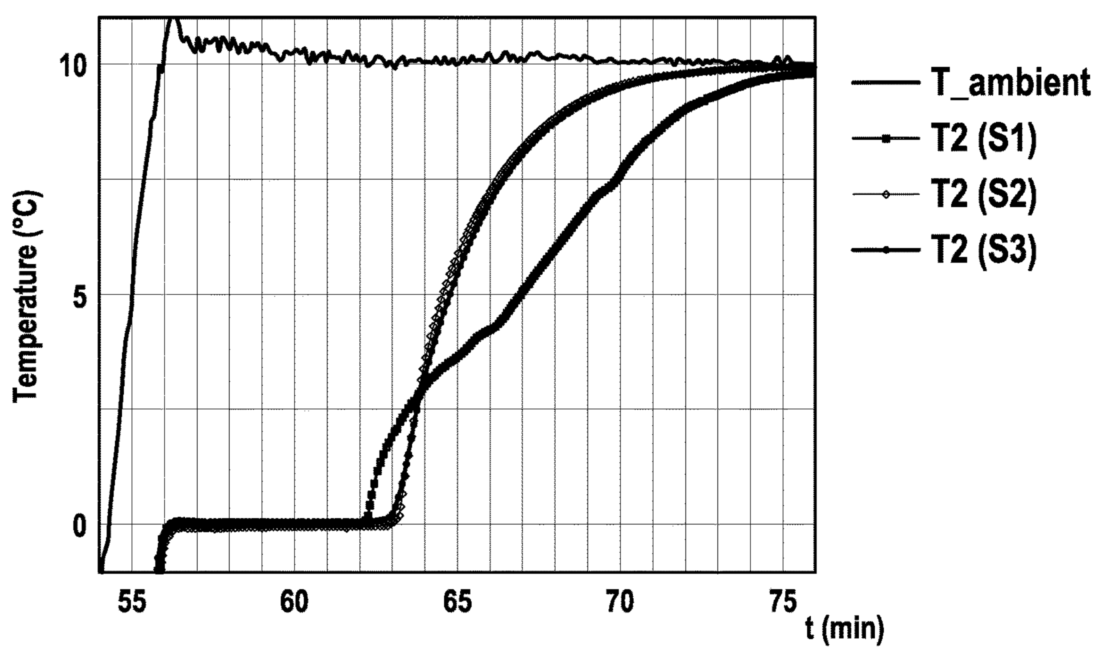
FIG. 10 shows an eighth diagram including several graphs, which represent temperatures of different cooling devices having different amounts of cooling medium during melting.

FIG. 10 shows an eighth diagram including several graphs, which represent temperatures of different cooling devices 20 having different amounts of cooling medium 32 during melting. The first to third cooling devices S1, S2, S3 correspond to the above first to third cooling devices S1, S2, S3. As may be seen from FIG. 10, only the temperature graph of the overfilled first cooling device S1 shows the broad phase transition and the two turning points within the third section.

Figure 11:
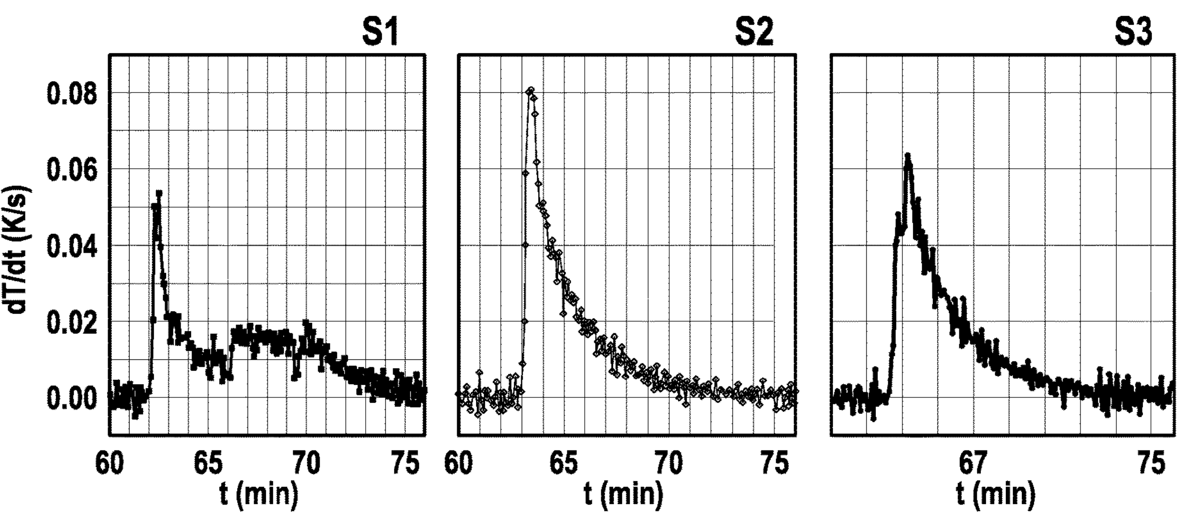
FIG. 11 shows a ninth diagram including first derivatives of the graph representative for the temperatures of the different cooling devices according to FIG. 10.

FIG. 11 shows a ninth diagram including first derivatives of the graphs representative for the temperatures of the different cooling devices 20 according to FIG. 10. As may be seen from FIG. 11, only the derivative of the graph of the overfilled first cooling device S1 shows the two extreme values, in this case local maxima, within the third section.

The first to fourth temperature graphs T1, T2, T3, T4 and their derivatives shown in FIGS. 5 to 11 correspond to different temperature patterns. These patterns vary depending on whether the corresponding cooling device 20 is overfilled or not and on the position of the housing 22 at which the corresponding temperature is measured. Therefore, all temperature graphs of overfilled cooling devices 20 with the corresponding temperature not being measured at the top or close to the top of the corresponding cooling device 20 show the same or at least a similar temperature pattern. A template of the temperature pattern may be determined in advanced and may be used for differentiating temperature patterns of overfilled cooling devices 20 from temperature patterns of properly filled cooling devices 20, e.g., by a neural network. The predetermined temperature pattern may include the width of the corresponding graph being larger than the above width threshold and/or the two or more turning points, each within the third section.

Figure 12:
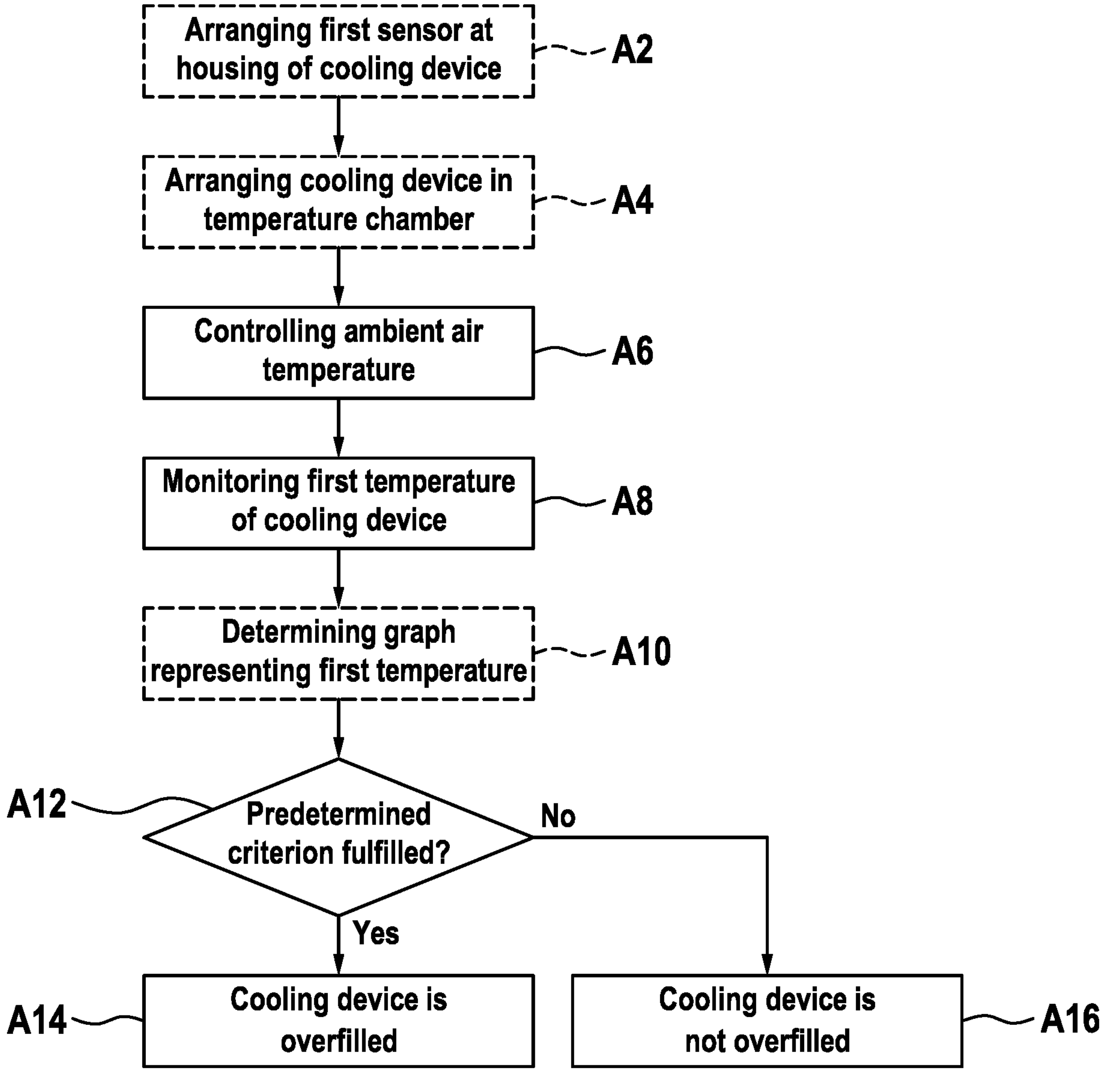
FIG. 12 shows a flow chart of an exemplary embodiment of a method for testing a two-phase cooling device, according to the present disclosure.

FIG. 12 shows a flow chart of an exemplary embodiment of a method for testing a two-phase cooling device, according to the present disclosure, in particular for testing one of the above cooling devices 20, S1, S2, S3. The method may be used for testing whether the corresponding cooling device 20 is overfilled by the cooling medium 32 or not. It is noted in this context, that in some cases an overfilling up to about 5% may be regarded as not being critical and/or as not being overfilled, because in these cases the pool and/or the pocket of liquid cooling medium 36, which is formed in the 5% overfilled cooling device 20, do not harm the cooling device 20 during freezing. For example, the elasticity of the material of the housing 22 may allow a slight deformation caused by the pool and/or pocket of the housing such that the corresponding disadvantages and/or damages may not occur.

In step A2, the temperature sensors, e.g. the first and second sensor 44, 50 may be attached to the housing 22 of the cooling device 20 to be tested, e.g. as explained above with respect to FIG. 4. If the test is carried out by analyzing the width of the temperature graphs and/or the amount of turning points of the graphs or the extreme values of the corresponding derivates, the first sensor 44 is sufficient for carrying out the method. If the test is carried out by analyzing the differences of the temperatures measured at different positions of the housing 22, the second sensor 50 is needed for carrying out the method.

In step A4, the cooling device 20 including the sensor(s) 44, 50 may be arranged in the temperature chamber. In particular, the cooling device 20 is arranged vertically, as it would be during normal usage and as it is shown with respect to FIGS. 1 to 4.

In step A6, the temperature of the ambient air, e.g., the above ambient temperature T_amb, is controlled. In particular, the temperature of the ambient air may be controlled such that the cooling medium 32 within the cooling device 20 to be tested undergoes a phase transition from its liquid state to its solid state and afterwards from its solid state to its liquid state, from its liquid state to its solid state only, or from its solid state to its liquid state only. In the following, it is assumed, that only the phase transition from the liquid state to the solid state is monitored and analyzed for testing the cooling device 20. However, the method easily may be extended to monitoring and analyzing both phase transitions, or only the phase transition from the solid state to the liquid state. For example, in case of water as the cooling medium 32, the ambient temperature T_amb may be controlled such that it crosses 0° C., e.g., from 10° C. to −10° C., e.g., by the controller 48.

In step A8, the temperature of the cooling device 20 may be monitored, e.g., the first temperature T1. Additionally, another temperature of the cooling device 20 may be monitored, e.g., the second, the third, and/or the fourth temperature T2, T3, T4. In particular, the temperature(s) may be monitored during the third section, which corresponds to the freezing section of the corresponding graph.

In step A10, the graph(s) representing the monitored temperature(s) may be determined. For example, the graph representing the first temperature T1 may be determined.

In step A12, it is determined whether the monitored temperature fulfills the predetermined criterion. The different options for determining, whether the monitored temperature fulfills the predetermined criterion or not, are explained below with respect to FIGS. 13, 14, and 15. If the predetermined criterion is fulfilled, the method proceeds in step A14. If the predetermined criterion is not fulfilled, the method proceeds in step A16.

In step A14, it is determined that the cooling device 20 under test is overfilled.

In step A16, it is determined that the cooling device 20 under test is not overfilled.

Figure 13:
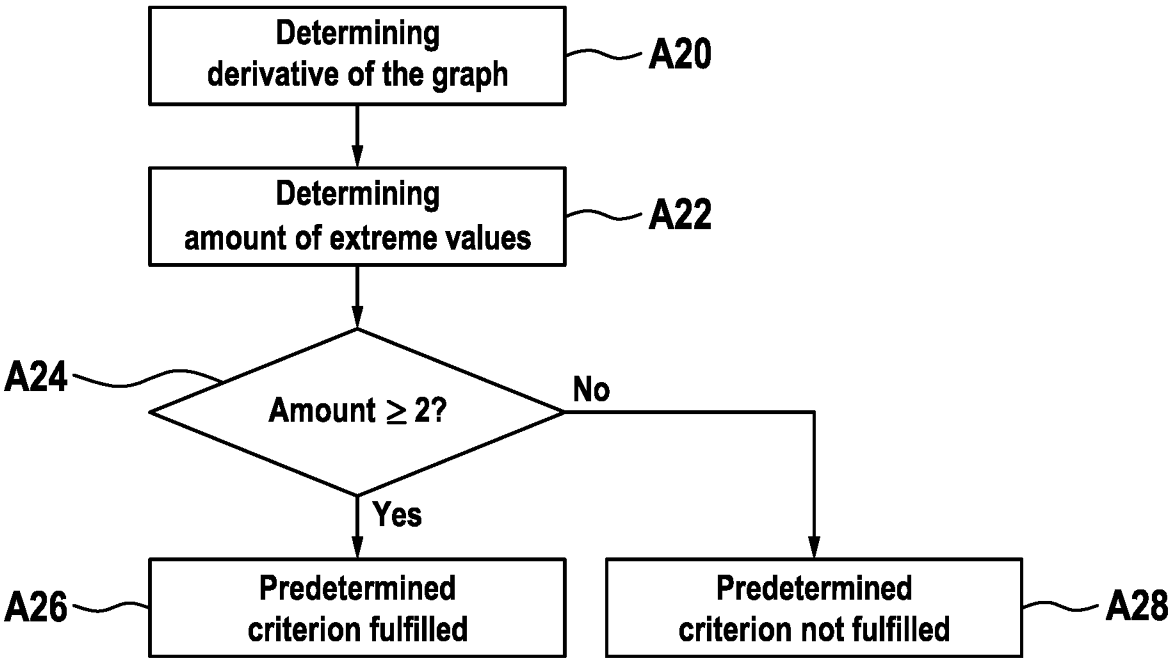
FIG. 13 shows a flow chart of an exemplary embodiment of a method for determining whether a predetermined criterion is fulfilled, according to the present disclosure.

FIG. 13 shows a flow chart of an exemplary embodiment of a method for determining whether the predetermined criterion is fulfilled, according to the present disclosure. The method of FIG. 13 may be implemented, e.g., as a subroutine, in the method explained with respect to FIG. 12. In particular, the method of FIG. 13 may be carried out as the step A12 of the method of FIG. 12.

In step A20, the derivative of the graph, which has been determined in step A10 of the method of FIG. 12, may be determined, e.g., by a corresponding mathematical application.

In step A22, the amount of extreme values of the derivative is determined, e.g. within the duration of at least one of the phase transitions, e.g. within the third section.

In step A24, it is determined whether the amount of extreme values is 2 or more, in case the extreme values are determined for one phase transition only. If the amount of extreme values is 2 or more, the method proceeds in step A26. If the amount of extreme values is less than 2, the method proceeds in step A28. Alternatively, if both phase transitions are monitored, it is determined whether the amount of extreme values is 4 or more.

In step A26, it is determined that the predetermined criterion is fulfilled.

In step A28, it is determined that the predetermined criterion is not fulfilled.

Figure 14:
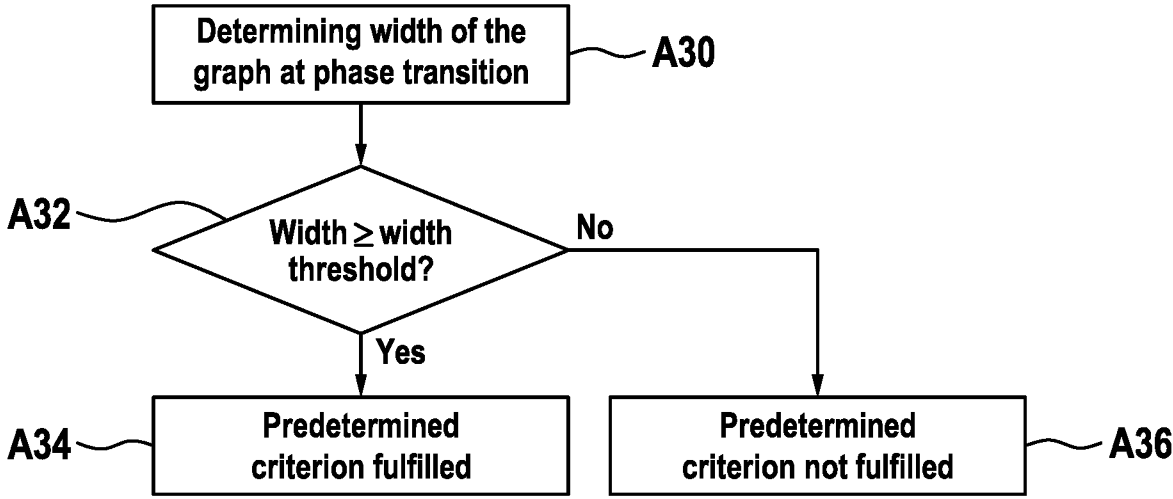
FIG. 14 shows a flow chart of an exemplary embodiment of a method for determining whether a predetermined criterion is fulfilled, according to the present disclosure.

FIG. 14 shows a flow chart of an exemplary embodiment of a method for determining whether the predetermined criterion is fulfilled, according to the present disclosure. The method of FIG. 14 may be implemented, e.g., as a subroutine, in the method explained with respect to FIG. 12. In particular, the method of FIG. 14 may be carried out as the step A12 of the method of FIG. 12.

In step A30, the width of the graph, which has been determined in step A10 of the method of FIG. 12, during at least one of the phase transitions, e.g., within the third section, is determined.

In step A32, it is determined whether the width of the graph is larger than the predetermined width threshold. If the width of the graph is larger than the predetermined width threshold, the method proceeds in step A34. If the width of the graph is not larger than the predetermined width threshold, the method proceeds in step A36.

In step A34, it is determined that the predetermined criterion is fulfilled.

In step A36, it is determined that the predetermined criterion is not fulfilled.

Figure 15:
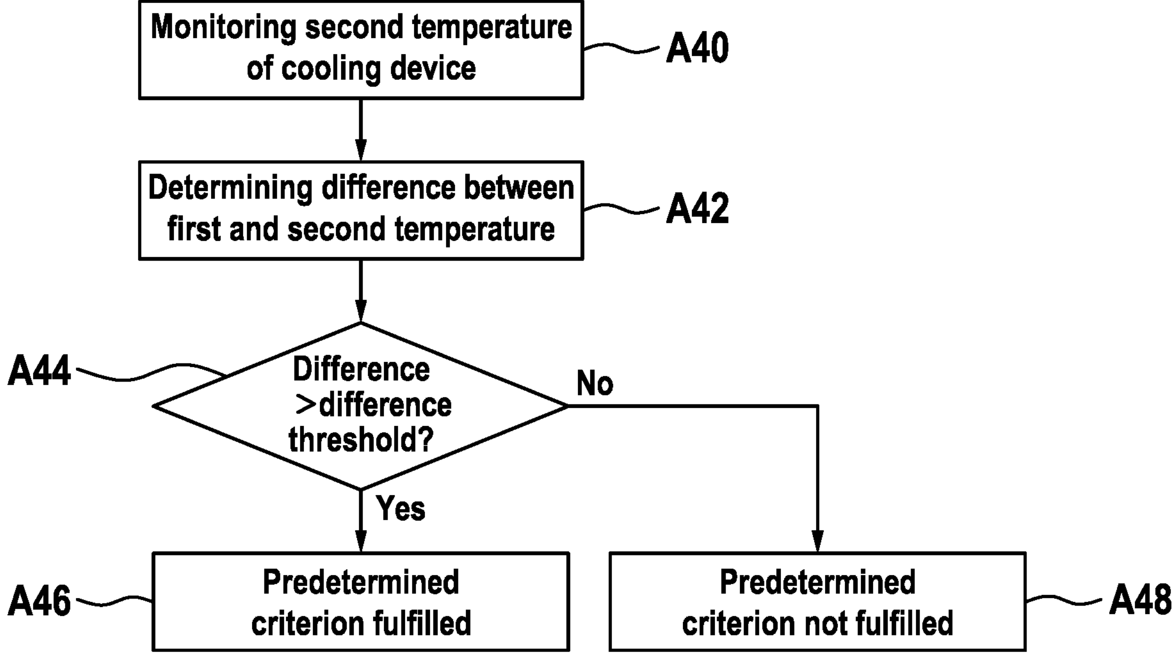
FIG. 15 shows a flow chart of an exemplary embodiment of a method for determining whether a predetermined criterion is fulfilled, according to the present disclosure.

FIG. 15 shows a flow chart of an exemplary embodiment of a method for determining whether the predetermined criterion is fulfilled, according to the present disclosure. The method of FIG. 15 may be implemented, e.g., as a subroutine, in the method explained with respect to FIG. 12. In particular, the method of FIG. 15 may be carried out as the step A12 of the method of FIG. 12.

In step A40, the second temperature T2, which has been sensed by the second sensor 50 in the top region 28, may be monitored.

In step A42, the difference between the monitored first and second temperature T1, T2 is determined, e.g., within the duration of at least one of the phase transitions, e.g., within the third section.

In step A44, it is determined whether the determined difference is larger than the predetermined difference threshold. If the determined difference is larger than the predetermined difference threshold, the method proceeds in step A46. If the determined difference is not larger than the predetermined difference threshold, the method proceeds in step A48.

In step A46, it is determined that the predetermined criterion is fulfilled.

In step A48, it is determined that the predetermined criterion is not fulfilled.

While the disclosure has been illustrated and described in detail in the drawings and foregoing description, such illustration and description are to be considered illustrative or exemplary and not restrictive; the disclosure is not limited to the disclosed embodiments. Other variations to the disclosed embodiments can be understood and effected by those skilled in the art and practicing the claimed disclosure, from a study of the drawings, the disclosure, and the appended claims. In the claims, the word “comprising” does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A method for testing a two-phase cooling device, the two-phase cooling device having a housing surrounding a cavity and a cooling medium within the cavity, the method comprising:

controlling a temperature of ambient air of the two-phase cooling device such that the cooling medium within the cavity undergoes phase transitions from its liquid state to its solid state and/or from its solid state to its liquid state, while monitoring a first temperature of the two-phase cooling device;

determining whether the monitored first temperature fulfills a predetermined criterion; and determining that the two-phase cooling device is overfilled with the cooling medium if the predetermined criterion is fulfilled.

2. The method in accordance with claim 1, wherein determining whether the monitored first temperature fulfills the predetermined criterion further comprises:

determining at least one graph, which represents the monitored first temperature over a time during which the first temperature is monitored; and determining whether the at least one graph fulfills the predetermined criterion.

3. The method in accordance with claim 2, wherein;

the at least one graph of the monitored first temperature comprises a first section with a falling temperature indicating a supercooling of the cooling medium in its liquid state inside the two-phase cooling device, after that the at least one graph comprises a jump to a freezing temperature of the cooling medium indicating a start of freezing of the cooling medium, after that the at least one graph comprises a second section at the freezing temperature of the cooling medium indicating the freezing of the cooling medium, and after that the at least one graph comprises a third section with the falling temperature, wherein the predetermined criterion is searched in the third section.

4. The method in accordance with claim 3, wherein determining whether the at least one graph fulfills the predetermined criterion further comprises:

determining a first derivative of the at least one graph; and determining an amount of extreme values of the first derivate of the at least one graph during one of the phase transitions and/or within the third section, wherein the predetermined criterion is fulfilled, if the first derivate of a signal has at least two extreme values.

5. The method in accordance with claim 3, wherein determining whether the at least one graph fulfills the predetermined criterion further comprises:

determining a width of the at least one graph during at least one of the phase transitions of the cooling medium and/or within the third section, wherein the predetermined criterion is fulfilled, if the determined width is larger than a predetermined width threshold.

6. The method in accordance with claim 3, wherein the first temperature is sensed at a bottom region of the housing, the method further comprising:

monitoring a second temperature of the two-phase cooling device, wherein the second temperature is sensed in a top region of the housing, while monitoring the first temperature; and determining a difference between the monitored first temperature and the monitored second temperature during at least one of the phase transitions of the cooling medium and/or within the third section, wherein the predetermined criterion is fulfilled, if the determined difference is larger than a predetermined difference threshold.

7. The method in accordance with claim 1, wherein the first temperature is monitored for a predetermined amount of time.

8. The method in accordance with claim 1, further comprising:

arranging the two-phase cooling device in a temperature chamber, wherein the temperature chamber encloses the ambient air and enables the control of the temperature of the ambient air, prior to controlling the temperature of the ambient air.

9. The method in accordance with claim 1, further comprising:

arranging a first sensor at the housing such that the first sensor has a thermal contact to the housing and is thermally isolated against the ambient air, prior to controlling the temperature of the ambient air.

10. The method in accordance with claim 9, wherein the first sensor is arranged at a bottom region of the housing.

11. A controller for testing a two-phase cooling device, the two-phase cooling device having a housing surrounding a cavity and a cooling medium within the cavity, the controller comprising a processor and a memory, wherein the processor is configured to:

control a temperature of ambient air of the two-phase cooling device such that the cooling medium within the cavity undergoes phase transitions from its liquid state to its solid state and/or from its solid state to its liquid state, while monitoring a first temperature of the two-phase cooling device;

determine whether the monitored first temperature fulfills a predetermined criterion; and determine that the two-phase cooling device is overfilled with the cooling medium if the predetermined criterion is fulfilled.

12. The controller in accordance with claim 11, wherein the controller, to determine whether the monitored first temperature fulfills the predetermined criterion, is further configured to:

determine at least one graph, which represents the monitored first temperature over a time during which the first temperature is monitored; and determine whether the at least one graph fulfills the predetermined criterion.

13. The controller in accordance with claim 12, wherein:

the at least one graph of the monitored first temperature comprises a first section with a falling temperature indicating a supercooling of the cooling medium in its liquid state inside the two-phase cooling device, after that the at least one graph comprises a jump to a freezing temperature of the cooling medium indicating a start of freezing of the cooling medium, after that the at least one graph comprises a second section at the freezing temperature of the cooling medium indicating the freezing of the cooling medium, and after that the at least one graph comprises a third section with the falling temperature, wherein the predetermined criterion is searched in the third section.

14. The controller in accordance with claim 13, wherein the controller, to determine whether the at least one graph fulfills the predetermined criterion, is further configured to:

determine a first derivative of the at least one graph; and determine an amount of extreme values of the first derivate of the at least one graph during one of the phase transitions and/or within the third section, wherein the predetermined criterion is fulfilled, if the first derivate of a signal has at least two extreme values.

15. The controller in accordance with claim 13, wherein the controller, to determine whether the at least one graph fulfills the predetermined criterion, is further configured to:

determine a width of the at least one graph during at least one of the phase transitions of the cooling medium and/or within the third section, wherein the predetermined criterion is fulfilled, if the determined width is larger than a predetermined width threshold.

16. A non-transitory computer-readable medium embodying programmed instructions which, when executed by a controller for testing a two-phase cooling device, the two-phase cooling device having a housing surrounding a cavity and a cooling medium within the cavity, direct the controller to:

control a temperature of ambient air of the two-phase cooling device such that the cooling medium within the cavity undergoes phase transitions from its liquid state to its solid state and/or from its solid state to its liquid state, while monitoring a first temperature of the two-phase cooling device;

determine whether the monitored first temperature fulfills a predetermined criterion; and determine that the two-phase cooling device is overfilled with the cooling medium if the predetermined criterion is fulfilled.

17. The non-transitory computer-readable medium in accordance with claim 16, wherein the programmed instructions that direct the controller to determine whether the monitored first temperature fulfills the predetermined criterion, further direct the controller to:

determine at least one graph, which represents the monitored first temperature over a time during which the first temperature is monitored; and determine whether the at least one graph fulfills the predetermined criterion.

18. The non-transitory computer-readable medium in accordance with claim 17, wherein:

the at least one graph of the monitored first temperature comprises a first section with a falling temperature indicating a supercooling of the cooling medium in its liquid state inside the two-phase cooling device, after that the at least one graph comprises a jump to a freezing temperature of the cooling medium indicating a start of freezing of the cooling medium, after that the at least one graph comprises a second section at the freezing temperature of the cooling medium indicating the freezing of the cooling medium, and after that the at least one graph comprises a third section with the falling temperature, wherein the predetermined criterion is searched in the third section.

19. The non-transitory computer-readable medium in accordance with claim 18, wherein the programmed instructions that direct the controller to determine whether the at least one graph fulfills the predetermined criterion, further direct the controller to:

determine a first derivative of the at least one graph; and determine an amount of extreme values of the first derivate of the at least one graph during one of the phase transitions and/or within the third section, wherein the predetermined criterion is fulfilled, if the first derivate of a signal has at least two extreme values.

20. The non-transitory computer-readable medium in accordance with claim 18, wherein the programmed instructions that direct the controller to determine whether the at least one graph fulfills the predetermined criterion, further direct the controller to:

determine a width of the at least one graph during at least one of the phase transitions of the cooling medium and/or within the third section, wherein the predetermined criterion is fulfilled, if the determined width is larger than a predetermined width threshold.

* * * * *